Sept. 21, 1943.　　　　G. KEINATH　　　　2,329,841
TEMPERATURE MEASURING INSTRUMENT
Filed March 25, 1942
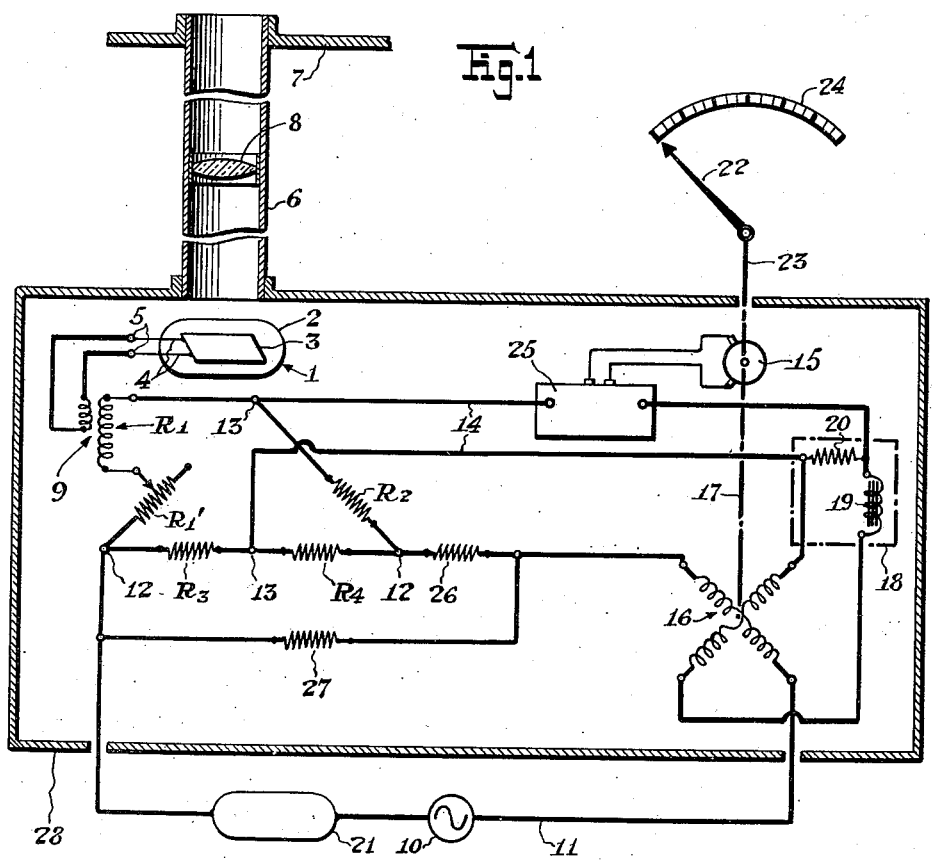
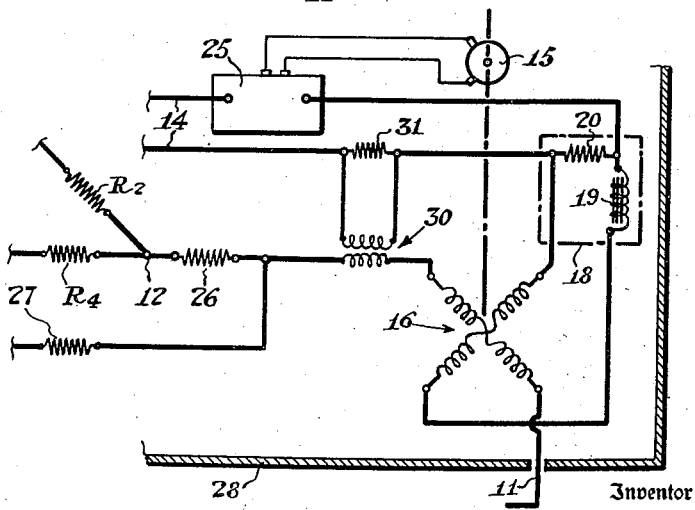
Inventor
George Keinath
By Henry Lanahan
Attorney Patented Sept. 21, 1943

2,329,841

UNITED STATES PATENT OFFICE 2,329,841

TEMPERATURE MEASURING INSTRUMENT

George Keinath, Larchmont, N. Y.

Application March 25, 1942, Serial No. 436,107

17 Claims. (Cl. 73—362)

This invention relates to temperature indicating instruments of the recording type, and more particularly to improvements in the class of instruments operated by heat radiation for measuring temperatures.

Instruments of the class mentioned employ radiation pyrometers or bolometers as the heat detecting means. These pyrometers are subjected to radiant heat from the heat source whose temperature is to be measured, and respond in electrical resistance according to their absolute temperatures. When a pyrometer is subjected to the radiant heat from a heat source, its temperature is increased above the ambient temperature but by an amount dependent upon the ambient temperature, the increase due to radiation being less when the ambient temperature rises and more when the ambient temperature falls. Since the pyrometer is placed at a distance from the heat source, usually under conditions where the ambient temperature is subject to considerable variation, it is highly important that the instrument be compensated for changing ambient temperature. In accordance with my invention I provide an improved receiver for a radiation pyrometer which is provided with ambient compensation especially adapted to the needs of the pyrometer. The receiver which I provide is moreover highly sensitive and accurate, free from drift and creepage and adapted to meet the stringent demands of present-day industrial applications.

It is accordingly an object of my invention to provide an improved temperature indicating and/or recording instrument which will accurately measure high temperatures.

It is another object to provide an improved temperature indicating and/or recording instrument which is practical for industrial use.

Another object is to provide a radiation pyrometer receiver of a rugged construction which is capable of long and dependable operation without need for being serviced.

A further object is to provide new and improved ambient compensation for a radiation pyrometer.

A still further object is to compensate a radiation pyrometer or bolometer for wide changes in ambient temperature by simple, reliable and effective means.

Still other and allied objects of my invention will more fully appear from the following description and the appended claims.

In the description of my invention, reference is had to the accompanying drawing, of which:

Figure 1 is a partially structural and partially diagrammatic showing of an instrument in accordance with my invention; and Figure 2 is a partial view illustrating a modification in my invention.

The instrument shown in the accompanying figures includes a radiation pyrometer 1, or bolometer, which comprises an evacuated glass bulb 2, typically about 12 mm. in diameter, in which there is located a small platinum foil 3 about .001 mm. thick and 2 x 2 mm. wide, this foil being supported by two relatively heavy wires 4 which extend through the bulb and form respective terminals 5 for the foil. This pyrometer is located at one end of a pipe 6 which has its other end open to the heat source whose temperature is to be measured, this heat source being for instance a furnace having an apertured wall 7 (fractionally shown) into which the pipe fits. Within the pipe, away from the flames and fumes of the furnace, there is located a lens 8 the purpose of which is to focus the heat rays from the furnace onto the foil 3 of the pyrometer. In response to this heat radiation, the temperature of the foil is increased above that of its ambient, and its resistance is accordingly increased. It is this increase in resistance which is measured to determine the temperature within the furnace.

The pyrometer is connected by a transformer 9 into one arm of an A. C.-operated Wheatstone bridge, as in accordance with my application, Serial No. 428,028, filed January 24, 1942. The transformer 9 here serves to step up the resistance of the pyrometer foil—which is only about .1 ohm—to a value $R_1$ in the bridge of say about 100 ohms. Lead connections of the pyrometer to the transformer are to have a resistance small in relation to that of the foil 3, and are accordingly made short and as large in diameter as is practical. In the arm of the bridge including the resistance $R_1$ there may also be included a small adjustable resistor $R_1'$ for taking care of manufacturing variations in the transformer 9. In the second arm of the branch circuit of the bridge which includes the resistance $R_1$ there is provided a standard resistance $R_2$; and in the other branch circuit of the bridge there are provided standard resistances $R_3$ and $R_4$ as separate arms, it being meant by the term "standard" that these resistances have known values and are not varied mechanically in the operation of the instrument. This bridge is supplied with alternating current by an A. C. voltage source 10 through leads 11 which connect to the branch circuits of the bridge at the junctions 12. In this circuit 11 there is included a ballast tube 21 for maintaining the supply of current to the bridge at a substantially constant value, as for purposes which will hereinafter be apparent. Connecting the junctions 13, between the resistances $R_1$ and $R_2$ and the resistances $R_3$ and $R_4$, is a circuit 14 (diagonal in relation to the bridge) in which, among other things hereinafter described, there are serially included an amplifier 25, which feeds out into an A. C. reversible motor 15, and the secondary winding of a variable transformer or variocoupler 16, the variocoupler having its primary winding serially connected in the current supply circuit 11. One of the coils of the varicoupler is to be held stationary and the other is to be angularly adjustable relative thereto; however between the motor 15 and the movable coil of the variocoupler there is provided a mechanical drive connection 17 (diagrammatically shown).

The resistances $R_1$ and $R_2$ are to have the same temperature characteristics, as are likewise the resistances $R_3$ and $R_4$; however, although the resistance $R_1$ has a temperature coefficient of platinum, the resistance $R_2$ need not be made of platinum but may be made inexpensively of copper, as copper has about the same temperature coefficient as that of platinum. Also, without heat radiation on the foil 3, the resistance $R_1$ is preferably to be substantially equal to that of the resistance $R_2$, and the resistance $R_3$ is then likewise to be substantially equal to the resistance $R_4$. Accordingly, at all ambient temperatures the bridge will be balanced and no voltage will be impressed by the bridge on the diagonal circuit 14. Under these conditions the coils of the variocoupler are to be held in a right-angle relationship, as shown, and thus the variocoupler will likewise introduce no voltage into the diagonal circuit. However, when the foil 3 is heated above the ambient temperature by radiation, its transformed resistance $R_1$ will be increased and the bridge will become unbalanced. Current will now flow in the diagonal circuit 14, and will energize the motor 15 and cause it to turn the movable coil of the variocoupler out of the right-angle relationship above-mentioned. An inductive voltage will thus be introduced into the diagonal circuit by the variocoupler. In order that this inductive voltage may be a counter E. M. F. in direct opposition to the E. M. F. impressed upon the circuit by the bridge, the mechanical drive connection 17 is arranged to decrease the angle between the coils of the variocoupler in the proper direction from center position as the unbalance of the bridge is increased, and vice versa; also, to correct for the substantially 90° phase displacement in the diagonal circuit between the induced counter E. M. F. and the impressed E. M. F. of the bridge, a phase correction network 18 is provided between the variocoupler and the motor. This network comprises a series iron-cored inductance 19 and a shunt resistance 20 made preferably of manganin so as to be substantially unresponsive to temperature variations.

From the foregoing description, it will be seen that, upon each change in unbalance of the bridge, an E. M. F. will be impressed upon the diagonal circuit 14 to drive the motor in one direction or another depending upon the direction of unbalance, but that as the motor is so driven it will adjust the angle of the movable coil of the variocoupler to introduce a counter E. M. F. in the diagonal circuit, the motor continuing to operate until the inductive counter E. M. F. is rendered substantially equal to the impressed E. M. F. In other words, the motor, acting as a null-current detector, angularly adjusts the movable coil of the variocoupler for each change in unbalance of the bridge to bring the current in the diagonal circuit to a substantially null value, and then comes to rest, the response of the motor being substantially in accordance with the diagonal voltage which the bridge would have were its diagonal circuit 14 open. Since the current in the primary winding of the variocoupler is constant—it being held so by the ballast tube 21—the voltage induced into the diagonal circuit by the variocoupler is proportional only to the angle of its movable coil relative to that of its stationary coil. The variations in the angle of the movable coil of the variocoupler, which are required for maintaining the diagonal current at a substantially null value, are thus proportional to the variations in the temperature of the heat source to which the pyrometer is subjected, and may be measured and recorded by a suitable marking device coupled directly to the motor 15 and moved relative to a suitably calibrated chart, such marking means being however herein simply represented as a pointer 22 coupled to the motor by a drive transmission 23 (diagrammatically shown) and moved relative to a scale 24.

It will be seen that a number of distinct advantages are realized by operating the recorder on an A. C. basis. For instance, as is above mentioned, A. C. operation permits the low resistance of the pyrometer to be stepped up by a transformer to a value in the bridge permitting an accurate design of the bridge; also, it permits the use of a variocoupler as the balancing means. Since the variocoupler is devoid of all sliding contacts and is not affected by wear or corrosion, it consequently lends great reliability and durability to the instrument. In addition to the above, A. C. operation permits the use of the A. C. amplifier 25 in the diagonal circuit 14 for increasing the sensitivity of measurement while yet maintaining a high degree of stability commensurate with such amplifiers.

It is a characteristic of radiation pyrometers that the heat transfer from a heat source to a radiation receiver foil 3 is proportional substantially, neglecting the absorption of the lens 8, to the difference between the fourth power of the absolute temperature $T_1$ of the source and the fourth power of the temperature $T_2$ of the receiver ($T_1^4 - T_2^4$). The ultimate temperature $T_2$ reached by the foil is however dependent not only on the heat radiation transferred thereto but also on the amount of heat lost therefrom. Since the heat loss is dependent on the ambient temperature, it being less as the ambient temperature rises and vice versa, the ultimate temperature $T_2$ will rise with increased ambient temperature. This rise in the temperature $T_2$ due to increased ambient temperature however causes the radiant heat transfer to the foil to be less. Accordingly, the extent of increase in the foil temperature due to heat radiation—which is the only component of the temperature $T_2$ the instrument is to measure—is less with increase in ambient temperature, and vice versa. Because of this effect of changes in ambient temperature on the instrument, there is a need to have the instrument compensated for changing ambient temperature.

In accordance with my invention, I correct for the effect of the ambient temperature on the instrument by providing a receiver for the radiation pyrometer which has a sensitivity increasing and decreasing with rise and fall in ambient temperature. This is accomplished simply by placing a manganin resistor 26 say of several times the bridge resistance, in the line 11 in series with the bridge and by placing a nickel resistor 27 in shunt with the bridge and manganin resistor; also, I preferably have the resistors $R_3$ and $R_4$ in the bridge also made of nickel. The pyrometer 1 and receiving apparatus therefor, including the compensating resistors just mentioned, are also all placed in a housing 28 (having an opening into which the pipe 6 is fitted) which serves to hold all parts of the receiving apparatus at substantially the same ambient temperature. Of course, if needed, the housing may be suitably water cooled to protect the interior apparatus from excessive heat.

Since nickel has a high temperature coefficient and manganin has a substantially zero temperature coefficient, and the bridge is supplied with a substantially constant current as is aforedescribed, an increase in ambient temperature will cause the shunt resistance 27 to increase more than will the resistance of the bridge, and thus to divert more current through the bridge. This increased current through the bridge will cause the potential drop across the bridge to increase, which potential drop will be even more augmented by the increase in resistance of the nickel resistors $R_3$ and $R_4$. Due to this increase in potential drop across the bridge, the E. M. F. which the bridge will impress upon the diagonal circuit 14 for a given change in unbalance of the bridge will be increased, as will likewise the sensitivity of the receiver for the pyrometer. Of course, for a decrease in ambient temperature, the opposite actions will take place, the potential drop across the bridge and the sensitivity of the receiver being then made less.

The result of this change in sensitivity of the receiver is to compensate for the varying heat radiation effect on the pyrometer caused by changes in the ambient temperature. While the compensation requirement of the pyrometer is a complicated function, it can be met within close tolerances over a wide ambient temperature range by the simple compensating means which I herein disclose.

It is seen from the foregoing description that the E. M. F. impressed on the diagonal circuit 14 by the bridge varies from zero to a maximum. Since the variocoupler is to produce a like range of counter E. M. F., its movable coil is limited in its range of movement to one side only from its center or null position (that is, its right-angle position above mentioned), as through an angular range of about 40°. I may however obtain about twice such angular range for the movable coil, and a similarly increased length of scale for the instrument, by the use of the revised circuit arrangement shown in Figure 2. According to this arrangement, I induce a fixed counter E. M. F. in the diagonal circuit 14 equal substantially in magnitude to the maximum inductive voltage of the variocoupler. This fixed counter E. M. F. is obtained from a transformer 30 having its primary placed in the constant-current supply circuit 11 and its secondary connected across a manganin resistor 31 that is serially connected in the diagonal circuit As this fixed inductive voltage in the diagonal circuit must itself be annulled by the variocoupler to provide an inductive voltage range in the diagonal circuit beginning from zero, the movable coil of the variocoupler will have to start at a point about 40° back from its center position, instead of at its center position as in the former case, but will stop again at about 40° beyond center position. Thus the angular range of the variocoupler is doubled, as likewise is the net inductive voltage range for this voltage will begin at zero, will obtain the value of the fixed counter E. M. F. when the movable coil reaches center position and will reach substantially twice this value when the movable coil has progressed to about 40° beyond center position.

The scale calibrations for the instrument herein disclosed will follow approximately the fourth power of the absolute temperature being measured, the scale having increasingly wider divisions at the upper end. Any of various well-known expedients, which are not herein necessary to show, may however be resorted to to convert the scale to linear basis.

The embodiments of my invention herein disclosed are intended to be illustrative and not limitative of my invention, as the same are subject to changes and modifications without departure from the true scope of my invention, which I endeavor to express according to the following claims.

I claim:

1. A temperature measuring instrument including an A. C.-operated Wheatstone bridge, a radiation pyrometer connected into one arm of said bridge, a motor connected diagonally in relation to the bridge, and means controlled by said motor for introducing an E. M. F. in series therewith and in counter-relation to the E. M. F. impressed on the motor by the bridge.

2. A temperature measuring instrument including a Wheatstone bridge, means supplying alternating current to said bridge, a radiation pyrometer connected into one arm of said bridge, a motor connected diagonally in relation to the bridge, and a variocoupler controlled by said motor and having one coil serially included in the current supply circuit to the bridge and another coil in the diagonal circuit of the bridge in series with said motor.

3. In an instrument for measuring high temperatures including a radiation pyrometer: the combination of a Wheatstone bridge including said pyrometer in one arm thereof and having standard resistances in its other arms, means supplying alternating current to said bridge, a variocoupler having one coil energized by said alternating current and another coil connected diagonally to said bridge, and a null motor serially included in the diagonal circuit of the bridge and controlling said variocoupler to maintain the current in said circuit at a substantially null value when the bridge is unbalanced by variations in the resistance of said pyrometer.

4. In an instrument for measuring high temperatures comprising a Wheatstone bridge having three impedance arms of a prescribed order of magnitude, a radiation pyrometer, a transformer coupling said pyrometer into the fourth arm of said bridge and presenting to the bridge a resistance of the order of said magnitude, an A. C. current supply for said bridge, a variocoupler having one coil energized by said current supply and one other coil connected diagonally to said bridge, and a motor serially included in the diagonal circuit of the bridge for controlling said variocoupler to maintain the current in said diagonal circuit at a substantially null value.

5. In an instrument for measuring high temperatures including a Wheatstone bridge and a radiation pyrometer inductively coupled into one arm of said bridge: the combination of a substantially constant source of alternating currrent connected to the branch junctions of said bridge, a variocoupler having its primary serially connected in the constant current supply circuit to the bridge and its secondary connected across the branches of said bridge in diagonal relation thereto, and a motor connected in serial relation with said secondary for controlling said variocoupler to maintain the current in the diagonal circuit of the bridge at a substantially null value for each condition of unbalance of the bridge.

6. In a measuring instrument operating in terms of the extent of unbalance of a Wheatstone bridge which is supplied with an alternating current: the combination of a motor connected diagonally in relation to said bridge; a variocoupler having its primary coil serially included in the current supply circuit to the bridge and its secondary coil connected diagonally to the bridge, the coils of said variocoupler being adjustable angularly by said motor to produce a counter E. M. F. in the diagonal circuit of the bridge variable from zero to a maximum whereby to restore the current in said diagonal circuit to a substantially null value for each change in unbalance of the bridge; and means to introduce a counter E. M. F. in said diagonal circuit, fixed in relation to the value of current supplied to said bridge, for permitting a range of adjustment of the variocoupler extending in both directions from its center position.

7. In an instrument for measuring high temperatures including a radiation pyrometer having a sensitivity to heat radiation varying with the ambient temperature of the pyrometer: the combination of a Wheatstone bridge including said pyrometer in one arm thereof; means for measuring the extent of unbalance of said bridge; and means, associated with said bridge and responsive to changes in said ambient temperature, for varying the potential applied to the bridge whereby to compensate for the said variable sensitivity of the pyrometer.

8. In an instrument for measuring high temperatures including a radiation pyrometer having a sensitivity to heat radiation varying with the ambient temperature of the pyrometer: the combination of a Wheatstone bridge exposed to said ambient temperature and including said pyrometer in one arm thereof, said bridge being in itself unresponsive in respect of its balancing to changes in its ambient temperature; a potential supply for said bridge; null-current detecting means for measuring the diagonal voltage of said bridge; and means, responsive to variations in said ambient temperature, for varying the potential from said supply to said bridge whereby to compensate for the variable sensitivity of said pyrometer.

9. In a temperature measuring instrument including temperature-indicating means and a radiation pyrometer having a sensitivity to radiation from a heat source variable with change in the ambient temperature of the pyrometer: the combination of a Wheatstone bridge including said pyrometer in one arm of one branch circuit thereof and including resistance arms in the other branch circuit thereof having a temperature coefficient higher than that of said pyrometer, said bridge being exposed to said ambient temperature and being in itself unresponsive in respect of its balancing to changes in its ambient temperature; a supply of substantially constant current; means responsive to changes in said ambient temperature for feeding a variable percentage of said constant current through said bridge; and means connected diagonally to said bridge and operable automatically according to the diagonal voltage of the bridge for actuating said temperature-indicating means.

10. In a temperature measuring instrument including temperature-indicating means and a radiation pyrometer having a sensitivity decreasing with increase in its ambient temperature, and vice versa: the combination of a Wheatstone bridge having a branch circuit including said pyrometer as one arm and a standard resistance having substantially the temperature coefficient of said pyrometer as a second arm, the second branch circuit of said bridge including standard resistances as separate arms having like temperature coefficients; a source of alternating current connected to said bridge; a variocoupler having one coil in the current supply circuit to the bridge and one other coil connected diagonally to the bridge; a motor serially included in the diagonal circuit of the bridge for controlling said variocoupler to maintain the diagonal current at a substantially null value and for actuating said indicating means; and means to increase the flow of current through said bridge in response to increases in said ambient temperature, and vice versa, whereby to compensate for the said variation in sensitivity of said pyrometer.

11. In a temperature recording instrument including a radiation pyrometer having a sensitivity variable with ambient temperature: the combination of a resistance Wheatstone bridge including said pyrometer as one arm and unresponsive in respect of its balancing to changes in its ambient temperature; a source of substantially constant alternating current connected to said bridge; a variocoupler having a coil in the current supply circuit to said bridge and a coil connected diagonally to said bridge; a motor in the diagonal circuit of the bridge controlling said variocoupler to restore the diagonal current of the bridge to a substantially null value upon each change in resistance of said pyrometer; and means to vary the current flow through the bridge to compensate the instrument for the said variable sensitivity of the pyrometer, comprising a series resistance in said constant-current supply circuit having a temperature coefficient less than those of the resistance elements of the bridge, and a resistance connected in shunt with the bridge and said series resistance and having a temperature coefficient not less than those of said bridge elements, said compensating resistances being held at the same ambient temperature as are said bridge elements.

12. An ambient-compensated receiver for a radiation pyrometer comprising a Wheatstone bridge having said pyrometer connected into one arm thereof; an alternating current supply connected to said bridge and including means responsive to ambient temperature to vary the potential drop across the bridge; a circuit connected diagonally to said bridge and including one coil of a variocoupler, the other coil of said variocoupler being serially connected in said current supply circuit; and a null-motor in said diagonal circuit for controlling said variocoupler.

13. An ambient-compensated receiver for a radiation pyrometer comprising a Wheatstone bridge having one branch including nickel resistors as separate arms and a second branch having one arm inductively coupled to said pyrometer and a second arm having substantially the same temperature coefficient as that of the pyrometer; a manganin resistor in series with said bridge; a nickel resistor shunting said bridge and maganin resistor; a variocoupler having one coil connected serially to the bridge and a second coil connected diagonally to the bridge; a null motor in the diagonal circuit of the bridge for controliing said vario-coupler; and a substantially constant alternating current supply for said circuit system.

14. A temperature measuring instrument including a variable temperature-responsive impedance element, a balanceable measuring circuit having an alternating current source connected with said impedance element and containing a zero branch to develop an unbalance voltage depending in magnitude and direction upon the departure of said impedance element from a balance magnitude, adjustable circuit means also connected with said zero branch for impressing on said branch a voltage in opposition to said unbalance voltage, drive means electrically connected with said zero branch to be controlled by the resultant effect of said unbalance and opposing voltages, said drive means being mechanically connected with said circuit means for adjusting the latter so as to reduce said resultant effect to zero, and a movable structure associated with said adjustable circuit means so as to assume a position indicative of the adjustment of said circuit means and hence of the temperature magnitude measured by said impedance element.

15. A temperature measuring instrument including a radiation pyrometer having an electric resistance variable in response to temperature variations to be measured, a balanceable measuring circuit having an alternating current source connected with said pyrometer and containing a zero branch tending to carry an unbalance voltage depending in magnitude and direction upon the departure of said resistance from a given magnitude, adjustable circuit means connected between said zero branch and said current source for superimposing on said branch a voltage in opposition to said unbalance voltage, drive means electrically connected with said zero branch to be controlled by the resultant effect of said unbalance and opposing voltages, said drive means being operatively connected with said circuit means for adjusting the latter so as to reduce said resultant effect to zero, and a movable structure associated with said adjustable circuit means, whereby said structure is controlled to assume a position indicative of the adjustment of said circuit means and of the temperature magnitude measured by said pyrometer.

16. A temperature measuring instrument including a circuit element having an electric resistance variable in response to the temperature to be measured, a balanceable measuring circuit having an alternating current source connected with said circuit element and containing a zero branch tending to carry an unbalance voltage depending in magnitude and direction upon the departure of said resistance from a given magnitude, adjustable circuit means connected between said zero branch and said current source for superimposing on said branch a voltage in opposition to said unbalance voltage, drive means electrically connected with said zero branch to be controlled by the resultant effect of said unbalance and opposing voltages, said drive means being connected with said circuit means for adjusting the latter so as to reduce said resultant effect to zero, a movable structure associated with said adjustable circuit means so as to assume a position indicative of the adjustment of said circuit means, and a constant circuit member arranged in said zero branch and connected with said current source so as to modify said resultant effect by a superposed constant voltage component in order to adjust the range of adjustment of said circuit means.

17. A temperature measuring instrument including a radiation pyrometer having an electric resistance variable in response to temperature variations to be measured, an alternating current circuit of high resistance relative to that of said pyrometer and containing a measuring branch, a transformer having a low-resistance secondary connected with said pyrometer and a high-resistance primary connected with said circuit so as to vary its impedance in accordance with the resistance variation of said pyrometer, adjustable circuit means arranged in said circuit branch for producing in said branch a differential current condition relative to that caused by said impedance variations, drive means operatively connected with said circuit means for adjusting the latter, said drive means being electrically connected to said branch so as to be controlled in dependence upon the departure of said differential current condition from a given value, and means connected with said adjustable circuit means to effect a measuring function in accordance with the adjustment of said circuit means indicative of said value.

GEORGE KEINATH.